Feb. 22, 1949.  J. H. PERCY  2,462,669
PROCESS AND APPARATUS FOR PHOTOCATALYTIC REACTIONS
Filed Feb. 3, 1942
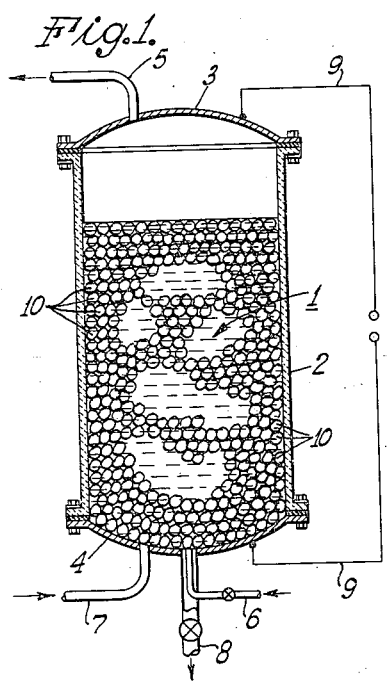
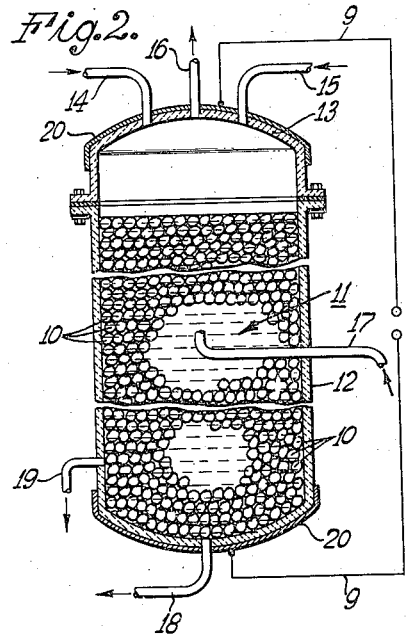
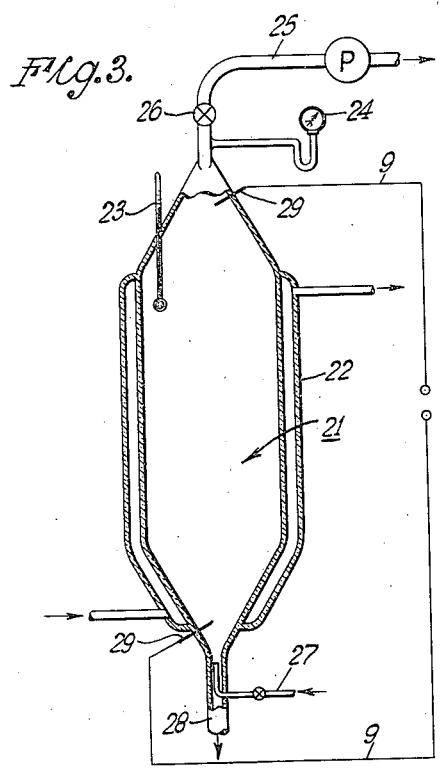
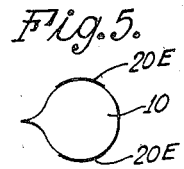
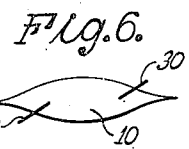
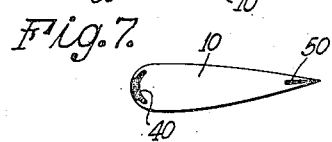
INVENTOR
Joseph Henry Percy
BY
ATTORNEY Patented Feb. 22, 1949

2,462,669

UNITED STATES PATENT OFFICE 2,462,669

PROCESS AND APPARATUS FOR PHOTO-CATALYTIC REACTIONS

Joseph Henry Percy, New York, N. Y., assignor to Colgate-Palmolive-Peet Company, Jersey City, N. J., a corporation of Delaware Application February 3, 1942, Serial No. 429,374

13 Claims. (Cl. 204—162)

The present invention relates to a photocatalytic process and apparatus and, more particularly, to a method and apparatus for providing actinic light in a reaction vessel. The invention is particularly directed to a process of reacting organic material with sulphur dioxide and chlorine in the presence of substantially uniformly distributed actinic rays.

Radiant energy has been used as a catalyst in many and various chemical reactions, the wave length of the light employed depending upon the particular reaction to be catalyzed. It has been the practice to provide transparent or translucent reaction vessels, such as those of glass or quartz, with a light source either outside the vessel or centrally located therewithin. However, the intensity of light varies inversely with the square of the distance from its source, thus producing a very uneven reaction in large vessels, and the efficient capacity of prior art reaction vessels is therefore limited because of this phenomenon. Even in cases where structural parts of reaction vessels have been constructed of quartz or other light-transmitting materials in order to have the rays reach the reactants, the results obtained have not been entirely satisfactory.

It is an object of the present invention to provide a process for producing substantially uniform actinic light throughout the interior of a reaction vessel.

It is another object of this invention to provide a new method for supplying radiant energy of substantially uniform intensity to catalyze chemical reactions.

It is a further object of this invention to provide a process for preparing organic sulphonyl halides by the reaction of an organic material having a hydrocarbon radical of at least six carbon atoms with sulphur dioxide and chlorine in the presence of luminescent light, preferably uniformly distributed throughout the body of reactants.

It is also an object of the invention to provide reaction vessels having means for producing actinic light inside the vessels in an improved and very efficient manner, thus providing means for avoiding the use of light-transmitting structural parts.

Other objects and advantages of the present invention will be apparent from the following description, taken in conjunction with the accompanying drawing, in which:

Fig. 1 illustrates a sectional view of a reaction vessel adapted for batch operation in accordance with this invention;

Fig. 2 depicts a fragmentary sectional view of a reaction vessel adapted for continuous operation, showing another modification of the invention;

Fig. 3 is a sectional view of another reaction vessel, illustrating a further modification of the present invention; and Figs. 4 to 7 are representations of various forms of discharge tubes or vessels adapted to be employed within the reaction vessels of the invention.

According to this invention, a reaction vessel or receptacle is filled wholly or in part with a plurality of smaller, closed, transparent or translucent tubes or vessels, each filled with a gas, vapor or mixture of gases and/or vapors under reduced pressure. The smaller tubes or vessels are subjected to a high-frequency and/or high-voltage fluctuating or alternating electric field, which ionizes the gas molecules and induces the Geissler discharge glow or spectral emission in the rarefied gas or vapor in the vessels. Radiation of the desired wave length for the particular reaction to be catalyzed is produced by a proper choice of the gases or vapors sealed into the smaller vessels, and the reacting materials are permitted to surround the smaller vessels. The source of the high-voltage alternating electric field may be a Tesla coil or similar device or, under proper conditions, an ordinary induction coil, or other suitable source. The voltage may be of the order of about 5,000 to about 50,000 volts, although voltages either considerably higher or considerably lower than this range can be satisfactorily employed. The current through the discharge tubes is a function of voltage, frequency and capacity, so that, with very high frequencies, voltages down to about 100 or even lower may be used. The product of frequency and voltage is high, preferably between about 20,000 and about 100,000,000 or higher, depending upon the length of the reaction vessel, area and number of electrodes, type of discharge tube, etc.

It is preferred to make the reaction vessel of a dielectric, such as earthenware, brick or other ceramic material, quartz, glass or other vitreous material, hard rubber, natural or synthetic resins or other plastics, and the like. Electrodes are provided at both ends, thus producing the effect of setting up the reaction vessel between the plates of a condenser having a very wide gap. This produces a radiant discharge throughout the rarefied gas or vapor in the smaller vessels. As there is only a thin film of the reacting materials between the smaller vessels or tubes, largely upon the tubes themselves, the actinic light is at practically maximum intensity at every part of the volume of the reaction mixture. Electrodes of extended area may be provided either externally or within the reaction vessel, or point electrodes at opposite ends of the vessel can be employed, or the end portions of the vessel itself may instead comprise the electrodes. Other types of electrodes may also be used, and they may be positioned in locations other than those shown, and it will be appreciated from the foregoing that an electrode of one type may be provided at one end of the reaction vessel and an electrode of a different type employd at the opposite end.

The smaller discharge vessels may be plain or may be provided with focal discharge points or areas. These foci may comprise metallic nodes, spots or buttons on the inner walls of the vessel, preferably at opposite points thereon, or metal wires or rods passing through the vessel wall, preferably perpendicularly thereto and at opposite points thereon, or external metallic coats or caps at opposite sides of the wall, or other devices serving a similar function. Foci of two different types may be employed at the opposite sides of the same discharge tube.

Where one of the reactants is a gas the activity of which it is desired to catalyze, it may be of advantage to fill the smaller vessels with the same gas. By using this as the discharge gas, the radiation therefrom will be exactly those wave lengths which are strongly absorbed by the gas in the reaction mixture, thereby providing optimum activation per unit energy in the radiation. For example, when it is desired to catalyze a chlorination reaction, it has been found advantageous to fill the small discharge vessels with gaseous chlorine to provide radiation of optimum wave length for the molecules of chlorine gas in the reaction mixture. By this means it is possible in some cases selectively to react one gas from a mixture of gases or to direct the type of reaction from one or more gases. By providing different gases in the discharge tubes or vessels at different portions of the reaction vessel, different reactions or phases of the same reaction in the mixture may be preferentially catalyzed.

Where it is preferred to carry out a particular reaction at low pressures, the small discharge vessels may be eliminated, because at low pressures the gas of the reaction mixture can show the Geissler discharge glow, and the entire reaction vessel can therefore act as a single discharge tube. With the electrodes in contact with the low pressure gas, either direct or alternating current can be used.

The invention will now be more fully described with respect to the particular embodiments thereof, and illustrative examples will be provided. It will be understood that the invention is not limited to such embodiments and examples. Reference may be had to the accompanying drawing, wherein like characters denote similar parts in the respective figures.

Referring to Fig. 1, wherein a modification of the present invention adapted for batch operation is depicted, a reaction vessel 1 comprising an earthenware cylinder 2 flanged at both ends and having a metal top or cap 3 and a metal bottom 4 is provided. The top and bottom are also flanged and adapted for being tightly fitted to seal the cylinder. There is a vapor outlet 5 in the metal cap, and the bottom is provided with two inlets 6 and 7 and an outlet 8. Lead wires 9 connect the top and bottom, respectively, to opposite poles of a source of high tension alternating current. The reaction vessel is filled with a plurality of small glass vessels 10 adapted for containing gas at low pressure therewithin and for being sealed against the admission of the reaction mixture from the cylindrical vessel.

This apparatus is particularly simple in operation. The smaller vessels are filled with a gas or vapor giving a discharge glow of desired wave length and at a low pressure, say below about 20 mm. mercury. It is preferred to have the gas at below about 10 mm. mercury or even below 5 mm. mercury, but too low a pressure, say of 0.1 mm. mercury, does not provide as satisfactory results.

The discharge vessels are packed into the reaction vessel 1. After the reaction vessel has been filled with these smaller vessels or tubes, a charge of liquid reactant is run into the reaction vessel, which is then closed. The liquid reactant may be admitted instead through inlet 6, which is thereafter sealed. The high tension alternating current is turned on, and the electric discharge between the metal top 3 and bottom 4, which serve as electrodes, takes the path of lowest electrical resistance. Since this path is through the low pressure vessels 10, the Geissler discharge glow is induced in the low pressure gas in the small discharge tubes. The air in the vessel is substantially removed, and the desired gaseous reactant is passed into inlet 7 and bubbled through the liquid reactant, preferably at atmospheric pressure, although superatmospheric or subatmospheric pressures may also be used. The gas in the low pressure vessels is selected so as to radiate light of wave length which is strongly absorbed by the gaseous reactant of the reaction mixture, and the gaseous reactant in the reaction mixture which surrounds the discharge tubes 10 reacts with the liquid reactant to form the desired product. Any vapor product or by-product and any excess of the gaseous reactant is removed through the vapor outlet 5 at the top of the reaction vessel, and a liquid product can be removed at the bottom of the vessel through the outlet pipe 8. It will be understood from the foregoing that two or more liquid reactants may also be contacted with each other in the same apparatus.

This apparatus may also be employed for continuous operation. Thus, two or more gaseous reactants (or, say, liquids vaporizing during the process) may be passed into the reaction vessel, either separately or in admixture, and may there be contacted with each other at any required temperature. Under the influence of the actinic light from the low pressure gas in the smaller discharge vessels, a reaction can be catalyzed to provide a desired product.

*Example I*

When chlorinating toluene in the apparatus according to the modification shown at Fig. 1, the discharge tubes 10 are filled with chlorine gas at about 5 to about 10 mm. pressure, and these vessels are packed into the reaction vessel 1. After the reaction vessel has been filled with discharge tubes to a level preferably at least as high as the proposed level for the amount of toluene to be reacted, a charge of toluene is run into the vessel, and the inlet is then closed. A high tension alternating current of about 20,000 volts and about 1000 cycles is then turned on, and the electrical discharge between the metal top 3 and the metal bottom 4 takes a path through the low pressure tubes 10, inducing the Geissler discharge glow therein. The air in the vessel is substantially removed, and chlorine gas is passed into inlet 7 and through the toluene, preferably at atmospheric pressure. The chlorine in the low pressure discharge tubes radiates light of wave length which is most strongly absorbed by the chlorine of the reaction mixture, and the chlorine gas in the reaction mixture of chlorine and toluene which surrounds the discharge tubes 10 rapidly reacts with the toluene to form benzyl chloride. The amount of chlorine passed in for a given amount of toluene determines the character of the final product. Thus, benzyl chloride reacts with additional chlorine to form benzal chloride, which in turn reacts with still more chlorine to form benzenyl chloride. In general, the final product will be found to contain some of each of these materials. Hydrogen chloride and any excess chlorine passes out of the outlet 5, and the product is removed through the outlet pipe 8.

Example II

Operating continuously with the reaction vessel according to the modification shown at Fig. 1, gaseous pentane and chlorine are passed into the vessel, either separately or in admixture, and are there contacted with each other at about 40° C. The discharge tubes are filled with chlorine gas at a low pressure, and, under the influence of the actinic light induced in these tubes by the high tension alternating current, monochlorpentanes are produced. The product is continuously removed from the vessel through the outlet 8.

In Fig. 2, there is depicted an apparatus according to this invention adapted for continuous operation. A reaction vessel 11 of plastic or other suitable material and comprising a rimmed receptacle or body 12 and a tight fitting lid 13 is provided. The lid has two liquid inlets 14 and 15 and a vapor outlet 16, the latter preferably being centrally disposed. The body 12 of the vessel is equipped with a gas inlet pipe 17 which passes through the wall into its central portion, and there are liquid outlets 18 and 19, respectively at the bottom and at the lower portion of the side of the vessel. Both the bottom of the receptacle and its lid are fitted with a metallic cap 20, the two caps serving as electrodes and being connected by lead wires 9 to opposite poles of a source of high tension alternating current. Where convenient, metal foil or sheet may be wrapped about the ends of the reaction vessel to serve as electrodes. The reaction vessel is adapted to be filled with a multiplicity of low pressure discharge tubes 10, such as have been described with respect to the modification shown at Fig. 1.

In operating with this apparatus, the body 12 of the reaction vessel 11 is filled with a multiplicity of sealed glass or quartz ampules 10 containing a gas selected for the wave length of light induced therein by an alternating current, and the gas is at a low pressure, say below about 20 mm. mercury. A desired liquid reactant is admitted to the vessel through one of the inlets 14 and 15 and flows downwardly through the vessel and around the sealed ampules therewithin. The gaseous reactant comprising a desired gas or mixture of gases is admitted to the reaction vessel through inlet 17 part way up the reaction column. The gas reactant passes upwardly through the vessel and around the ampules in countercurrent flow through the liquid reactant. An additional liquid inlet is provided at the top of the vessel, so that a selective solvent, which may be inert, can also be passed downwardly through the vessel to dissolve and carry off the reaction product. During the time that these materials are passing through the reaction vessel, a high voltage (and/or high frequency) alternating current is passed between the electrodes 20 to induce a glow in the low pressure gas in the discharge tubes. The desired reaction is catalyzed by the actinic light induced in the tubes, and the reaction product is produced. This product may be dissolved by the solvent provided and can be removed through outlet 18 at the bottom of the vessel. Vapor products of the reaction, as well as excess gaseous reactants, are removed through the vapor outlet 16 at the top of the column, while unreacted liquid reactant may be removed through outlet 19.

Example III

Employing the reaction vessel 11 shown at Fig. 2, the glass ampules 10 are filled with chlorine gas at about 5 mm. pressure and sealed. The receptacle 12 of the reaction vessel is filled with these ampules, and a Pennsylvania white mineral oil of paraffin base and having an average molecular weight of about 235 is passed into the reaction vessel through inlet 14 and flows downwardly through the vessel and around the sealed ampules therewithin. A mixture of about 3 parts of gaseous sulphur dioxide to 1 part of gaseous chlorine is admitted to the central portion of the reaction vessel through inlet 17 and passes upwardly through the vessel and around the ampules in countercurrent flow to the mineral oil. Liquid sulphur dioxide also enters the reaction vessel through inlet 15 and flows downwardly concurrently with the mineral oil. During this time, a high voltage alternating current is passed between the metal caps 20 and takes a path through the low pressure chlorine gas in the ampules, inducing the Geissler discharge glow therein. The reaction of the mineral oil with the sulphur dioxide and chlorine is catalyzed by the actinic light induced in the ampules, and organic sulphonyl chlorides are produced. The sulphonyl chlorides are dissolved by the liquid sulphur dioxide and, settling to the bottom, can be removed through outlet 18. The vapor product, as well as excess gaseous sulphur dioxide and chlorine, are removed through the vapor outlet 16, and unreacted mineral oil is removed through outlet 19. In carrying out this operation as a continuous process, it is preferred to control the rates at which the various reactants are admitted to the reaction vessel so that the mineral oil achieves a gain in weight of about 20%; at this point, the reaction mass contains approximately 50% of sulphonyl chlorides.

The product thus formed can be hydrolyzed by stirring with an aqueous 30% solution of sodium hydroxide at a temperature of about 90° C. The mixture may be diluted so as to contain about 10% of the sulphonated product, isopropyl alcohol is added, and the mixture is then extracted several times with ligroin to remove unsulphonated material. Excess alkali in the sulphonate solution is neutralized with sulphuric acid, and, as will be apparent, a certain amount of sodium sulphate will thereby be formed. The solution is nearly colorless and can be dried to yield a flaky, snow-white product.

The sulphonation reaction may also be carried out in the liquid phase, using liquid sulphur dioxide and liquid chlorine as reactants in the mixture. Moreover, the ampules may be filled with gases other than chlorine, such as sulphur dioxide, or some of them may be filled with chlorine and some of them, say at a different portion of the reaction vessel, may be filled with sulphur dioxide, argon or other gas.

A third modification of the present invention, illustrated by Fig. 3, is primarily intended for reactions which can occur at low pressures. In this apparatus, the reaction vessel serves also as the discharge tube. A glass reaction vessel of cylindrical form narrowing down at each end thereof to form a conical top and a conical bottom is provided. The vessel is furnished at its middle and lower portions with a glass cooling jacket 22 having suitable inlet and outlet tubes for circulation of a cooling fluid, and a thermometer 23 and pressure gauge 24 for indicating conditions of temperature and pressure therewithin are also supplied. An outlet 25 at the top of the vessel is connected to a vacuum pump and is provided with suitable valvular means 26. At the bottom of the vessel an inlet 27 and an outlet 28 are provided, and a point electrode 29 passing through the wall of the reaction vessel is provided at each end thereof. Lines 9 connect the electrodes with a source of high-voltage current, either direct or alternating.

In operating with this device, the materials to be reacted, at least one of which is gaseous, are sealed in the reaction vessel at subatmospheric pressure, say of the order of about 10 mm. or less, and the electric current is turned on. The high-voltage current produces a discharge glow in the rarefied gas of the reaction vessel, and the actinic light therefrom is sufficient to catalyze the main reaction. In this manner, the greatest intensity of radiation is located right at the molecules of gas which are intended to enter into the reaction desired.

The desired proportion of reactants may be admitted at the start of the reaction or, alternatively, as the activated gaseous reactant is used up in the reaction, additional material may be admitted through inlet 27. When the desired quantity has reacted, the reaction product can be withdrawn through outlet 28.

*Example IV*

When brominating quinoline in the apparatus according to the modification depicted at Fig. 3, quinoline and a fraction of the total amount of bromine required for bromination are drawn into the reaction vessel through inlet 27 at room temperature, and the vessel is then evacuated as an aid to displace the air with bromine vapors. The valvular means 26 on outlet 25 is then closed, and the vessel is cooled to about −25° C., giving a pressure of less than about 10 mm. mercury. The current is then turned on between the electrodes 29, activating the bromination by the glow of the bromine gas. As the reaction proceeds at about constant temperature, the pressure within the vessel falls, and more bromine is admitted until the desired quantity has reacted. The reaction product, bromquinoline hydrobromide, is withdrawn, as aforesaid, through outlet 28.

The smaller vessels, bulbs or tubes in which the low pressure gas or vapor is contained may be of any of a wide variety of shapes and sizes. It is preferred to employ small lengths of tubing which are sealed off at both ends, as shown at Fig. 6 of the drawing. These can be filled with the desired gas and sealed by evacuating a long length of glass tubing and pulling the desired gas therethrough until it fills the tubing at the required pressure. The two ends of the length of tubing can then be sealed off, and the tubing is then cut and drawn into required lengths by means of a small flame. Another satisfactory form of low pressure vessel, substantially spherical in shape, is shown at Figs. 4 and 5, and the ampule or sealed vial type, rounded at one end and drawn to a point at the other, is shown at Fig. 7. A convenient size for these discharge vessels has been found to be about one-half inch to about one and one-half inches in diameter, and about 0.1 mm. to about 0.3 mm. has been found a convenient thickness, although it will be appreciated that their size and thickness may vary considerably both below and above this range, depending upon the size of the reaction vessel and upon the reaction to be carried out therein. Discharge tubes of widely different sizes and/or shapes may be used at the same time in a single reaction vessel. Gas sampling tubes, preferably of relatively small size, may also be used, especially where it is desirable to be able to change the gas in the discharge tubes frequently, but their expense will ordinarily limit their use.

The discharge tube may be plain, as shown in Fig. 4, or may be provided with discharge foci, as aforesaid. Fig. 5 illustrates a modification wherein metallic surfaces 20E are capped or plated upon opposite sides of the external wall of the discharge vessel. These would also be applicable to any other shape of discharge tube, such as those shown at Figs. 6 and 7. Similarly, metal wires 30 passing through the opposite walls of the discharge tubes, as shown in Fig. 6, can be used with any other shape of tube. At Fig. 7, there is shown a discharge tube 10 having a metallic spot or button 40 on the inner surface of the broad end of the tube; such internal metallic surfaces may be provided at opposite sides of any shape of tube. At the narrow end of tube 10 of Fig. 7 there is an internal metallic projection 50, which modification may also be provided at opposite sides of any of the discharge tubes. Moreover, the metallic focus at one side of a tube may be of a different type from the metallic focus at the opposite side of the same tube, as shown in Fig. 7; in like manner, an external metal cap may be provided at one side of the tube and an internal node or a wire passing through the wall provided at the opposite side, or any other combination. Some of the advantages of supplying focal discharge points or areas are that they provide a path of lower electrical resistance for the electric discharge between the electrodes and that they assist in directing the discharge through the low pressure gas in the tubes so that greater uniformity of activation of the low pressure gas in the several tubes is attained. If desired, connections by means of wires, metal foils, etc., may be made between the discharge tubes.

The discharge vessels containing the low pressure gas or vapor may be made of any material capable of transmitting light, including transparent or translucent glass of various compositions, quartz, fused silica, polymethyl methacrylate (Lucite), plastic or other material which is substantially inert both to the gas to be contained therein and to the reactants and reaction products under the reaction conditions.

The material of which the discharge tubes is made should also be selected with a view to the wave length of light to be transmitted. Thus, glass transmits only a short way into the ultraviolet, and quartz a little farther but rarely much below wave lengths of $2 \times 10^{-5}$ cm. (2000 angstrom units), while fluorite is transparent to a minimum wave length of about 1200 A. The tubes may also be made selectively absorbent for light of undesired wave length. Thus, the smaller discharge vessels within the reaction vessel may be made of colored glass or may be coated with transparent or translucent colored paints or lacquers to filter out any undesired radiation. The discharge tubes may also be lined with a fluorescent material, so that a gas giving an ultraviolet glow, such as argon, can be used in the tubes. Fluorescent materials, including zinc silicate, zinc beryllium silicate, calcium tungstate, magnesium tungstate, barium tungstate, cadmium borate, and the like, change this ultraviolet light to visible light. Other rays, such as X-rays, may be used to activate these fluorescent materials.

Because of the fact that only a thin layer of the reaction mixture separates the many luminescent sources of actinic light, the radiant energy is particularly efficient, and maximum absorption can be obtained. It will be appreciated from the foregoing that the method and apparatus described herein can be satisfactorily applied to any chemical reaction in which actinic radiation is effective. The use of actinic light as a catalyst in reactions involving halogenations, decomposition of hydrocarbons by dehydrogenation and/or cracking, hydrogenations, including the hydrogenation of oils as in Walter's process, oil hardening, and various other reactions, is well-known, and the present invention is applicable to all these processes. Improved results in the formation of organic sulphonyl chlorides are achieved by providing actinic light in the manner herein set forth when reacting organic compounds, especially aliphatic, and particularly those having from about 8 to about 26 carbon atoms (and more preferably about 12 to about 20 carbon atoms) per molecule, including straight, branched and cyclic, saturated and unsaturated, hydrocarbons, carboxylic acids, alcohols, and other organic materials, as well as chlorinated and other derivatives of these compounds, with sulphur dioxide and chlorine and/or with sulphuryl chloride.

"Luminescence," as used herein, is intended to include any emission of light not ascribable directly to incandescence, and therefore capable of occurring at relatively low temperatures.

Although the present invention has been described with respect to particular embodiments and particular constructive features, it will be appreciated that equivalent elements and equivalent process steps can be used and that variations and modifications of the invention can be made without departing from the spirit thereof.

I claim:

1. A process for producing organic sulphonyl chlorides which comprises passing a mineral oil of paraffin base over a multiplicity of transparent discharge tubes containing chlorine gas at about 5 mm. pressure, passing a gaseous mixture of about 3 parts of sulphur dioxide to 1 part of chlorine over said discharge tubes in contact with the mineral oil and in counter-current thereto, and producing a glow discharge in said tubes by passing through said low pressure chlorine gas in said discharge tubes a high-voltage alternatin current, thereby bringing about substantial reaction of sulphur dioxide and chlorine with said oil and the production of organic sulphonyl chlorides.

2. A process for producing organic sulphonyl chlorides which comprises contacting in a reaction mass an organic aliphatic compound having about 8 to about 26 carbon atoms per molecule with a mixture of sulphur dioxide and chlorine in the presence of a multiplicity of vessels in said mass capable of transmitting light and containing chlorine gas at a pressure below about 20 mm., and producing a glow discharge in said low pressure chlorine gas in said vessels, thereby bringing about substantial reaction of sulphur dioxide and chlorine with said organic aliphatic compound and the production of organic sulphonyl chlorides.

3. A process for producing organic sulphonyl halides which comprises passing an organic aliphatic compound in a liquid film over a packing of transparent vessels containing a gas under a pressure sufficiently low to permit induction of the Geissler discharge glow therein, contacting said liquid film with a mixture of sulphur dioxide and a halogen, and producing a glow discharge in said transparent vessels, thereby bringing about substantial reaction of sulphur dioxide and halogen with the organic aliphatic compound and the production of organic sulphonyl halides.

4. A process for photocatalytic reactions which comprises contacting reactants in free flowing condition and at least one of them being in gaseous state with each other adjacent to the surfaces of a multiplicity of vessels in an enclosed space, said vessels having voids therebetween for the passage of fluids between and around said vessels, said vessels being capable of tranmitting light and containing the same gas as said gaseous reactant at a pressure below about 10 mm., and producing a discharge glow in said vessels, whereby the activity of the gaseous reactant is catalyzed and substantial reaction of said reactants is brought about.

5. In the photocatalytic reaction of chlorine with another material, the improvement which comprises exciting chlorine gas to produce a discharge glow, and illuminating the materials therewith during the reaction.

6. In the photocatalytic reaction of halogen with another material, the improvement which comprises exciting halogen gas at low pressure to produce a discharge glow and illuminating the materials therewith during the reaction.

7. In the photocatalytic reaction of a gaseous reactant with another material, the improvement which comprises catalyzing the activity of said gaseous reactant by illuminating it with the light from the gaseous reactant excited to produce a discharge glow.

8. In the process of photocatalyzing the reaction between halogen and another material with which the halogen reacts when catalyzed by light, the improvement which comprises exciting the halogen at low pressure to produce a discharge glow and simultaneously contacting said other material with said halogen.

9. In the process of photocatalyzing the reaction between a gaseous reactant and another material with which said gaseous reactant reacts when catalyzed by light, the improvement which comprises exciting said gaseous reactant at low pressure to produce a discharge glow and simultaneously contacting said other material with said gaseous reactant.

10. A device for photocatalytic reactions which comprises a receptacle having dielectric walls, inlet and outlet tubes in said receptacle, a multiplicity of small individual hollow transparent bulbs resting loosely as a packing in, and filling at least a portion of said receptacle, and electrodes on opposite sides of said multiplicity of bulbs, said bulbs being filled with a gas under low pressure which is capable of emitting a discharge glow when subjected to an alternating electrostatic field between said electrodes.

11. A reaction vessel for photocatalytic reactions comprising a dielectric cylinder, a metallic cap adapted to serve as an electrode at each end of said cylinder, inlet and outlet tubes in said vessel, and a multiplicity of small hollow globular transparent bodies filling a substantial part of said vessel as a loose packing, said bodies being filled with a gas under low pressure which is capable of emitting a discharge glow when subjected to an alternating electrostatic field between said electrodes.

12. A device for photocatalytic reactions which comprises a receptacle having a cylindrical dielectric wall provided with metallic ends adapted to serve as electrodes, and a multiplicity of small individual hollow transparent bulbs resting loosely as a packing in and filling at least a portion of said receptacle, said bulbs being filled with a gas under low pressure which is capable of emitting a discharge glow when subjected to an alternating electrostatic field between said electrodes.

13. A device for photocatalytic reactions which comprises an elongated dielectric receptacle, metallic caps covering the ends of said receptacle adapted to serve as electrodes, and a multiplicity of small individual hollow transparent bulbs resting loosely as a packing in and filling at least a portion of said receptacle, said bulbs being filled with a gas under low pressure which is capable of emitting a discharge glow when subjected to an alternating electrostatic field between said electrodes.

JOSEPH HENRY PERCY.

REFERENCES CITED

The following references are of record in the file of this patent:

UNITED STATES PATENTS

| Number | Name | Date |
|---|---|---|
| 1,352,086 | Rose | Sept. 7, 1920 |
| 1,459,777 | Leiser et al. | June 26, 1923 |
| 1,815,149 | Jakosky | July 21, 1931 |
| 1,853,688 | Leffer | Apr. 12, 1932 |
| 1,948,240 | Redd | Feb. 20, 1934 |
| 1,954,438 | Britton et al. | Apr. 10, 1934 |
| 2,055,809 | Wait | Sept. 29, 1936 |
| 2,080,933 | Rose | May 18, 1937 |
| 2,117,100 | Milas | May 10, 1938 |
| 2,163,898 | Van der Lande | June 27, 1939 |
| 2,189,279 | Bitner | Feb. 6, 1940 |
| 2,193,824 | Lockwood et al. | Mar. 19, 1940 |
| 2,223,504 | Abbott | Dec. 3, 1940 |
| 2,243,632 | Johnson | May 27, 1941 |
| 2,291,574 | Gleason et al. | July 28, 1942 |

OTHER REFERENCES

Electrochemistry of Gases and Other Dielectrics, Glockner and Lind, 1939, page 301.